(12) United States Patent
Exline

(10) Patent No.: US 6,634,493 B2
(45) Date of Patent: Oct. 21, 2003

(54) COMPACT DISC HOLDER AND BOOKLET

(75) Inventor: Christopher P. Exline, Chagrin Falls, OH (US)

(73) Assignee: William Exline, Inc., Cleveland, OH (US)

( * ) Notice: Subject to any disclaimer, the term of this patent is extended or adjusted under 35 U.S.C. 154(b) by 32 days.

(21) Appl. No.: 09/927,253

(22) Filed: Aug. 10, 2001

(65) Prior Publication Data

US 2003/0029742 A1 Feb. 13, 2003

(51) Int. Cl.[7] .............................................. B65D 85/57
(52) U.S. Cl. ..................................... 206/232; 206/308.1
(58) Field of Search .............................. 206/232, 308.1, 206/307, 307.1, 308.3, 309, 311, 312, 313, 387.13; 281/38, 45; D8/433; D9/346

(56) References Cited

U.S. PATENT DOCUMENTS

| | | | |
|---|---|---|---|
| 5,085,318 A | | 2/1992 | Leverick ...................... 206/312 |
| 5,484,054 A | * | 1/1996 | Kryszewski ................. 206/232 |
| D369,106 S | * | 4/1996 | Baker et al. ................. D9/433 |
| 5,595,401 A | | 1/1997 | Exline et al. .................... 281/2 |
| 5,669,491 A | | 9/1997 | Pettey ......................... 206/232 |
| 5,690,219 A | | 11/1997 | Harrer ...................... 206/308.1 |
| 5,725,093 A | | 3/1998 | Yamaguchi et al. ...... 206/308.1 |
| 5,749,463 A | | 5/1998 | Collins ..................... 206/308.1 |
| 5,775,490 A | | 7/1998 | Baker et al. .............. 206/308.1 |
| 5,800,659 A | | 9/1998 | Exline et al. ............... 156/250 |
| 5,806,672 A | | 9/1998 | Bosworth .................... 206/310 |
| 5,819,926 A | | 10/1998 | O'Brien et al. ........... 206/308.1 |
| 5,857,565 A | | 1/1999 | Baker et al. ................. 206/232 |
| 5,901,843 A | | 5/1999 | Gambardella et al. ... 206/308.1 |
| 5,913,539 A | | 6/1999 | Exline et al. ................... 281/2 |
| 5,931,293 A | | 8/1999 | Seelenmeyer ............ 206/308.1 |
| 5,957,281 A | | 9/1999 | Collins ..................... 206/307.1 |
| 5,971,157 A | | 10/1999 | Howell et al. .............. 206/755 |
| 6,032,795 A | | 3/2000 | Ehrlund et al. ............. 206/312 |
| 6,044,969 A | | 4/2000 | Denize et al. ........... 206/308.1 |
| 6,059,316 A | | 5/2000 | Whittington ................. 281/38 |
| 6,068,116 A | | 5/2000 | Bankhead ................... 206/232 |
| 6,073,763 A | | 6/2000 | Collins ..................... 206/308.1 |
| 6,105,762 A | | 8/2000 | Pettey ........................ 206/232 |
| 6,109,432 A | | 8/2000 | Pozzoli ....................... 206/232 |
| 6,110,551 A | | 8/2000 | Exline et al. .............. 428/40.1 |
| 6,120,228 A | | 9/2000 | Exline ........................... 412/2 |
| 6,170,658 B1 | | 1/2001 | Dering ..................... 206/308.1 |
| 6,186,320 B1 | | 2/2001 | Drew ....................... 206/308.1 |
| 6,186,332 B1 | | 2/2001 | Combs ....................... 206/759 |
| 6,216,862 B1 | | 4/2001 | Chang ..................... 206/308.1 |
| 6,220,504 B1 | | 4/2001 | Flynn et al. .................. 229/71 |
| 6,450,535 B1 | * | 9/2002 | Shafer ......................... 281/38 |

OTHER PUBLICATIONS

Case Logic Corp., *Case Logic Products: Product Categories: Audio* (last visited Jan. 14, 2002) <http://www.casedirect.com/cgibin/sgdynamo.exe?CODIV=0101&HTNAME=audio.htm&UID=!+USID!≦.

Case Logic Corp., *Case Logic Products: Product Catogories: Storage Sleeves*, (last visited Jan. 14, 2002)http://www.casedirect.com/cgibin/sgdynamo.exe?CODIV=0101&HTNAME=storSlv.htm&UID=2002011412100249>.

Univenture, Inc., *Disc Packaging Systems*, (last visited Jan. 14, 2002) <http://www.univenture.com/index.html>.

* cited by examiner

*Primary Examiner*—J. Mohandesi
(74) *Attorney, Agent, or Firm*—Womble Carlyle Sandridge & Rice, PLLC

(57) ABSTRACT

A combination compact disc holder and informational booklet comprising a cover and a plurality of pages, the cover and pages being made of substantially rectangular paper sheets, the cover being of heavier stock and including at least one pocket having such size and shape as to retain a compact disc therein, and the pages being of lighter stock and carrying printed information concerning the content of the compact disc stored in the at least one pocket, the pages being folded and sewn along a fold line and the cover being glued to an outer surface of an outermost page.

18 Claims, 8 Drawing Sheets

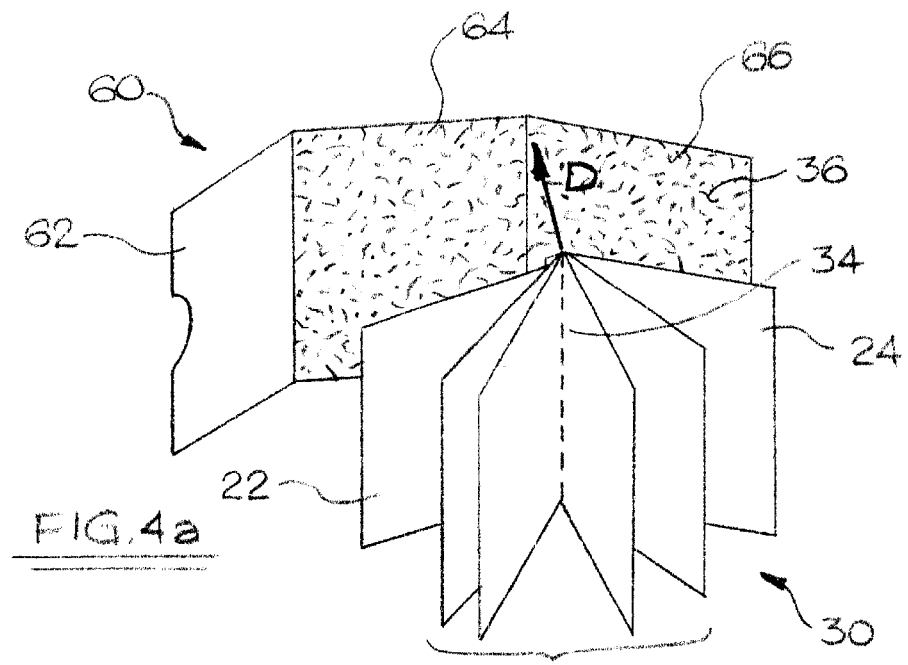
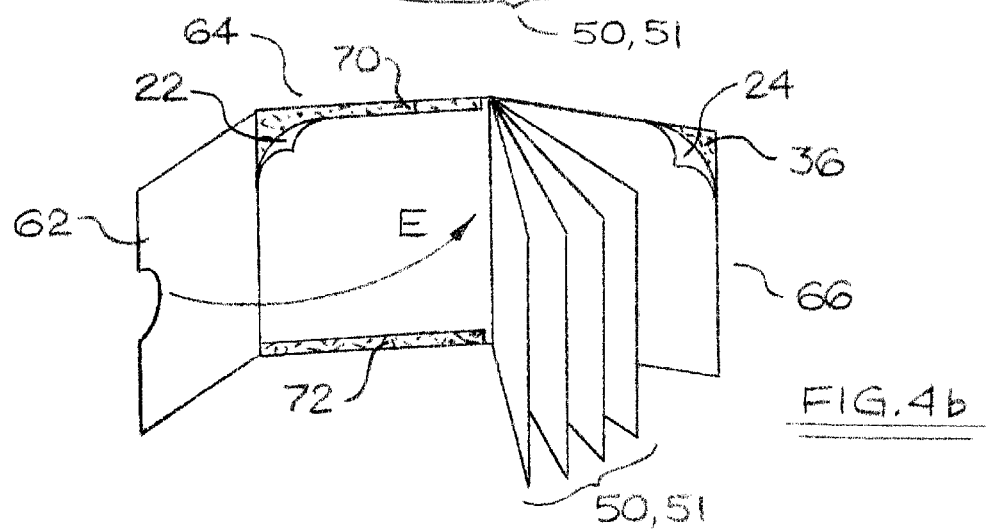
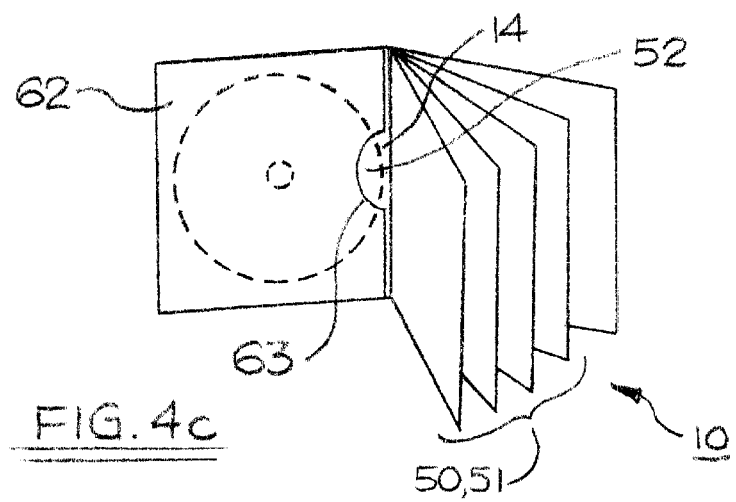

COMPACT DISC HOLDER AND BOOKLET

BACKGROUND OF THE INVENTION

1. Field of the Invention

The present invention relates generally to holders for compact discs, and more particularly, to compact disc holders that include printed information that accompanies the discs.

2. Description of the Prior Art

Compact discs have become a convenient, durable, and efficient means for digitally storing recorded music and computer software and data. Compact discs are round discs that are about 4¾ inches in diameter and slightly over 1 millimeter thick. Therefore, these discs are generally stored and transported in containers that are relatively flat.

Audio compact discs and compact discs containing computer software or data are typically stored in flat square plastic cases known as "jewel boxes". These cases include a square hard plastic base with a receptacle for holding a compact disc, and a hinged hard plastic cover that is attached to the base. While these cases have proven to be effective for storing compact discs, the plastic cases can be fragile and the simple hinge connections are prone to breakage. These cases are particularly subject to breakage when transported by mail. These cases also are relatively expensive to manufacture. Furthermore, the inclusion of printed material on or with such cases is problematic. It is often desirable to include printed information such as song lyrics or information about the recording artist with audio compact discs. For computer software compact discs, it is often desirable to include printed information with the compact discs such as instructions for using the software. While jewel boxes can be sized to include printed inserts inside the cases with the compact discs, such inserts are easily separated from the case and can easily be lost or misplaced. Therefore, there is a need for an inexpensive holder for compact discs that protects the compact discs, is durable, and includes space for printed material in a form that is easily accessible and permanently attached to the compact disc holder.

Others have attempted to provide compact disc holders that are less expensive to manufacture and are less prone to breakage than jewel boxes. For example, U.S. Pat. No. 5,085,318 discloses a compact disc folder formed from a single piece of cardstock. The cardstock is folded upon itself in tri-fold fashion to form a front and rear panel with an inside pocket for holding a compact disc. While this folder appears to be relatively inexpensive to produce, the area available for printed material is limited to the front and rear panels. U.S. Pat. No. 5,669,491 discloses a compact disc folder booklet that includes a cover, a pocket on an inside portion of the cover for holding a compact disc, and a plurality of pages for providing printed text relating to the content of the compact disc. While this folder addresses the need for providing a means for including printed material that is integral with a compact disc holder, the construction of this folder is complex, and accordingly, its production cost is unnecessarily high. For example, the cover and packet portion are formed from a single piece of material that is complex in shape and includes a series of tabs which must be punched from cardstock using expensive punches and dies. Simplifying the construction of such a folder would greatly reduce its cost of production. In addition, this folder requires a plurality of staples to connect the pages of the booklet to the cover. These staples are necessarily exposed on the outside of the folder along its spine. The exposed staples are unattractive in appearance, may snag on clothing or skin, and may rust if exposed to moisture. Therefore, a compact disc holder and booklet without staples and having a more finished appearance is needed.

Therefore, there remains a need for an inexpensive, durable, and attractive compact disc holder that includes no exposed staples and provides a means for including printed matter that is integral with the compact disc holder.

SUMMARY OF THE INVENTION

The present invention therefore is directed to a combination compact disc holder and informational booklet including a cover and a plurality of pages. The cover includes at least one pocket that is sized and shaped to receive and retain a compact disc. The cover, pages, and pocket are all constructed of rectangular sheets of paper. In addition, the pages carry printed information concerning the content of the compact disc. The cover includes a first panel having a first pocket on an inside surface of the first panel. Also, the cover may further include a second panel having a second pocket on an inside surface of the second panel.

In one embodiment, a cover has a fold which divides the cover into a first panel and a second panel. The first and second panels each include an inside surface, an outside surface, a bottom edge, a side edge, and a top edge. A pocket sheet is provided that is substantially coextensive with the first panel. The pocket sheet is attached to the inside surface of the first panel along the bottom edge, the side edge, and the top edge by a C-shaped strip of adhesive, thereby forming a pocket. The pocket is of suitable size to receive and retain a compact disc and has an opening adjacent to the fold. The unglued edge of the pocket sheet includes a cutout to facilitate insertion and removal of a compact disc from the pocket. At least one additional leaf is connected to the cover at the fold to form additional pages.

In another approach, a first leaf is attached to the cover at the fold to form a first page and a second page. The first leaf and the cover are coextensive, and the first page has an upper edge. A first adhesive strip attaches the first page to the inside surface of the first panel along the bottom edge, and a second adhesive strip attaches the first page to the inside surface of the first panel along the side edge. A pocket which is of suitable size to receive and retain a compact disc is thereby formed between the first panel and the first page. The first page may further include a cutout along its upper edge to facilitate grasping a compact disc contained in the pocket. Further, the holder and booklet may include at least one additional leaf that is attached to the cover and to the first leaf along the fold to form additional pages. Each additional leaf, the first leaf, and the cover are substantially coextensive.

In still another approach, the first leaf is again attached to the cover at the fold to form a first page and a second page, but the first page is narrower and shorter than the first panel of the cover. A flood coated adhesive covers the inside surface of the first and second panels, and seals the first page to the inside surface of the first panel and the second page to the inside surface of the second panel. Portions of the adhesive along the bottom edge and side edge of the first panel are uncovered by the smaller first page, thereby forming an L-shaped strip of adhesive on the inside surface of the first panel. A second leaf attached to the cover along the fold forms third and fourth pages. The third page is attached to the inside surface of the first panel along its bottom edge and side edge by the L-shaped strip of adhesive. A pocket is thereby formed between the first page and the third page. The pocket has an opening along its upper edge and is of suitable size to receive and retain a compact disc. A plurality of additional leaves may be attached to the cover and first and second leaves along the fold to form additional pages.

In yet another approach, the cover has an extended panel (a third panel) approximately the same size as the first panel. A second fold parallel to the first fold divides the cover between the first panel and the third panel. The first panel has an inside surface, a top edge, and a bottom edge. The first leaf has a first page that is narrower than the first panel, so that when it is secured to the inner surface of the cover, it leaves exposed a first and second adhesive strip along the top and bottom edge of the inner surface of the cover. The first adhesive strip extends along the top edge of the first panel and the second adhesive strip extends along the bottom edge of the first panel. The third panel is then attached to the inside surface of the first panel along the top and bottom edges. A pocket is thereby formed between the first panel and the third panel of the cover, wherein the pocket has a pocket opening adjacent to the second fold and the pocket is of suitable size to receive and retain a compact disc. At least one additional leaf is folded and attached to the cover along the second fold to form pages, each leaf being coextensive with the assembled cover.

In an alternate approach, the first leaf may be coextensive with the cover and a pattern of L- or C-shaped adhesive strips may be applied between the first panel and first page to form a pocket. Also, in any of the above approaches, the rear cover panel may include a second pocket for a second compact disc.

In an additional approach, the cover again includes a first cover panel and a second cover panel. The cover is attached to the first page or fly leaf of a paper booklet by a flood coating of adhesive on the inside surface of the cover. The first leaf is folded and divided into a front page and rear page. The front page is cut to expose a C-shaped strip of adhesive. The second leaf and all other leaves include a fold that divides the leaves into front and rear pages. The front page of the second leaf includes a slit or cutout that is parallel to and adjacent to the fold and is at least as wide as the diameter of a compact disc. The front page of the first leaf is attached to the top, side, and bottom edges of the inside of the first cover panel by the C-shaped strip of adhesive. The cutout in the front page of the second leaf forms an opening to a pocket formed between the front pages of the first and second leaves. A cutout is provided along the edge of the slit away from the fold to facilitate grasping a disc in the pocket. A slit may also be provided in the rear page for similarly forming a second pocket inside the second cover panel.

The holder/booklet may also include at least one leaf formed into additional pockets. The leaf is longer by fifty percent and has first and second folds which form a first page, a middle page, and a third page. The first page is folded along the first fold and is connected to the middle page by a C-shaped strip of adhesive which has been rolled, screened, or printed onto the middle page, thereby forming a pocket. A cutout along the unglued and unfolded edge of the first page facilitates grasping a disc in the pocket. One or more of these pocketed leaves can be assembled into any of the holders and booklets summarized above to provide additional pockets for holding discs.

The pocketed leaf may also be even longer and include a third fold forming a fourth page. The fourth page is folded along the third fold and is connected to the third page by a second C-shaped strip of adhesive, thereby forming a second pocket. A cutout along the unglued and unfolded edge of the fourth page facilitates grasping a disc in the second pocket. One or more of these double-pocketed leaves can be assembled into any of the holders and booklets summarized above to provide additional pockets for holding discs.

These and other aspects of the present invention will become apparent to those skilled in the art after a reading of the following description of the preferred embodiments when considered with the drawings.

BRIEF DESCRIPTION OF THE DRAWINGS

FIGS. 4(a)–4(c) are perspective views illustrating a third construction of the combination compact disc holder and informational booklet of FIGS. 1(a) and 1(b);

DETAILED DESCRIPTION OF THE PREFERRED EMBODIMENTS

Figure 1A:
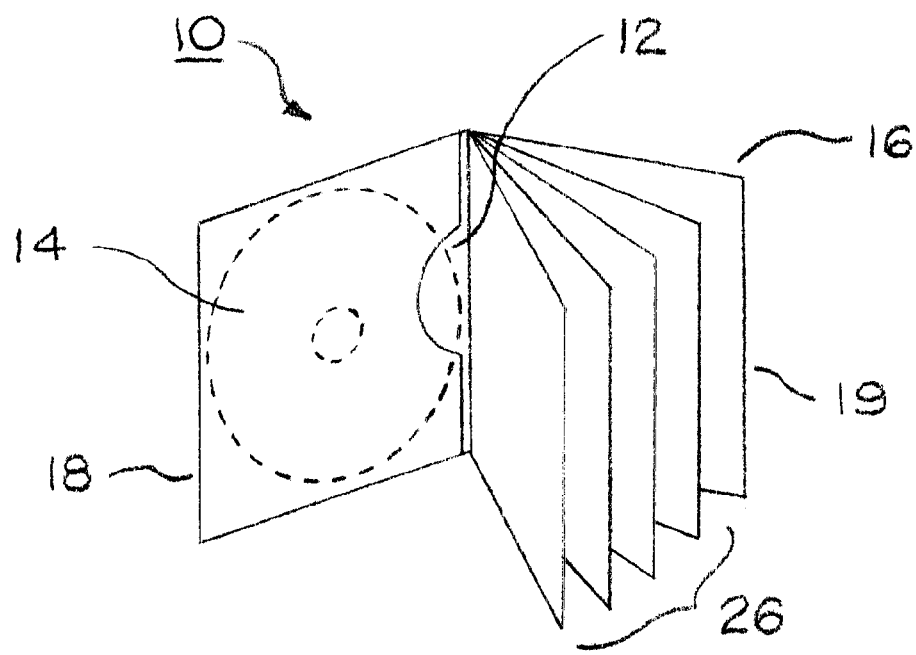
FIGS. 1(a) and 1(b) are environmental views of a combination compact disc holder and informational booklet according to the present invention.

In the following description, like reference characters designate like or corresponding parts throughout the several views. Also in the following description, it is to be understood that such terms as "first", "second", "outside", "inside", "top", "bottom", "side" and the like are words of convenience and are not to be construed as limiting terms.

Figure 1B:
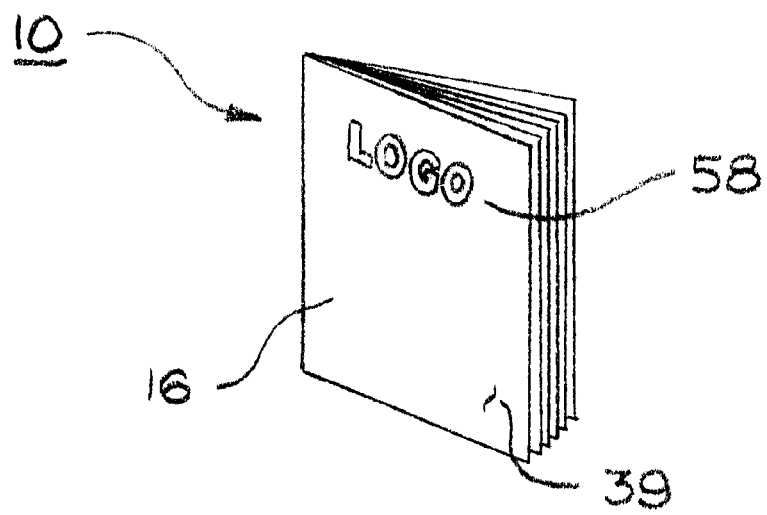

Referring now to the drawings in general and FIGS. 1(a) and 1(b) in particular, it will be understood that the illustrations are for the purpose of describing a preferred embodiment of the invention and are not intended to limit the invention thereto. FIGS. 1(a) and 1(b) illustrate a first embodiment 10 of a combination compact disc holder and informational booklet constructed in accordance with the present invention. The holder 10 has the general form of a booklet, and includes a cover 16 having an inside pocket 12 for holding a compact disc 14. The holder/booklet 10 folds to a compact size as shown in FIG. 1(b). Preferably, the holder/booklet 10 is about 5¼ inches wide by 5¼ inches tall when closed. The inward opening pocket 12 of the holder/booklet 10 is preferred because a compact disc 14 in the pocket is prevented from inadvertently falling or otherwise being dislodged from the pocket when the cover is closed. The holder/booklet 10 includes pages 26 for printed information about the disc 14. The holder/booklet 10 is preferably constructed entirely from paper and/or paperboard sheets that are substantially rectangular. The outer surfaces of the paper cover 16 may include a protective plastic coating 39.

Figure 2A:
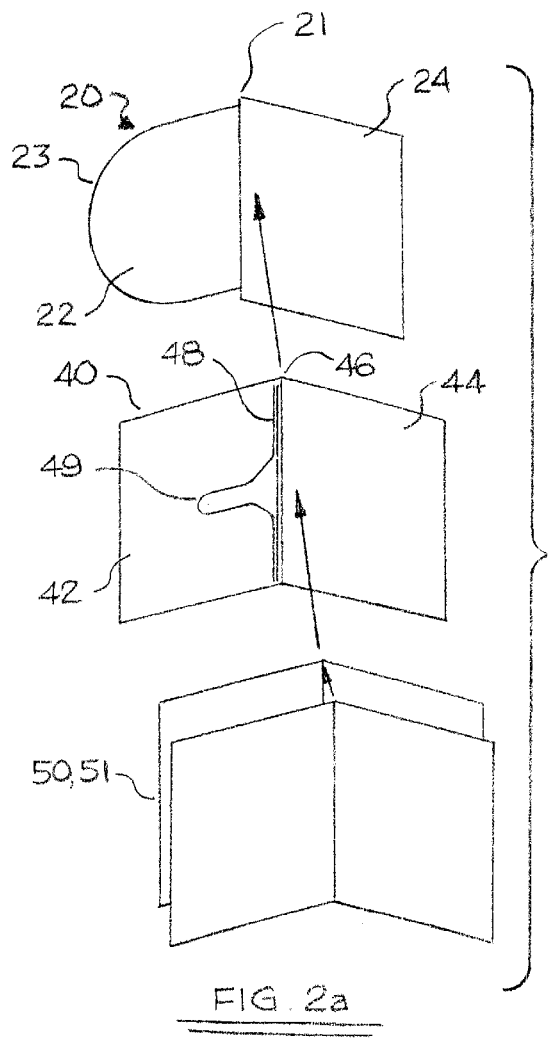
FIGS. 2(a)–2(d) are perspective views illustrating a construction for the combination compact disc holder and informational booklet of FIGS. 1(a) and 1(b)
Figure 2B:
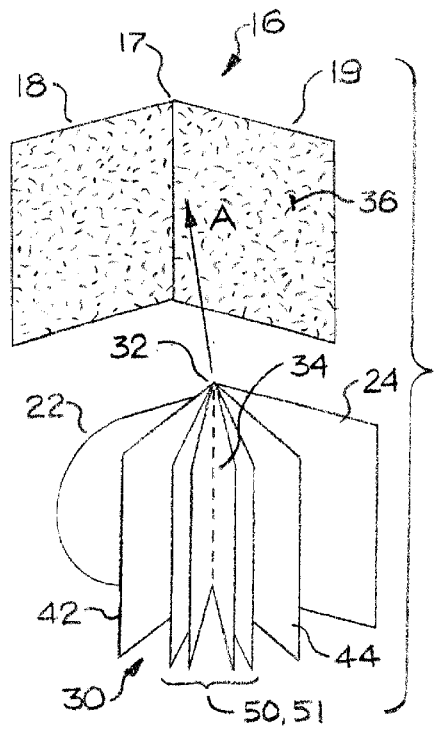

A preferred construction for the holder/booklet shown in FIGS. 1(a) and 1(b) is illustrated in FIGS. 2(a) through 2(d). As seen in FIGS. 2(a) and 2(b), a plurality of paper leaves are stacked together as indicated by the arrows to form booklet 30. A first leaf or fly sheet 20 is divided by a central fold 21 into a front fly page 22 and a back fly page 24. The front fly page 22 is die cut to form a semi-circular edge 23 having a radius slightly greater than the radius of a compact disc. A second leaf 40 is divided by a fold 46 into a front page 42 and a rear page 44. The front page 42 includes an opening formed by cutout 49 and a narrow slit 48 that is itself parallel and closely adjacent to the fold 46. The length of the slit 48 is at least slightly greater than the diameter of a compact disc. The cutout 49 is included in the front page 42 along one side of the slit 48 away from the fold 46. One or more additional leaves 50 are provided which are divided by folds into additional pages 51.

Figure 2C:
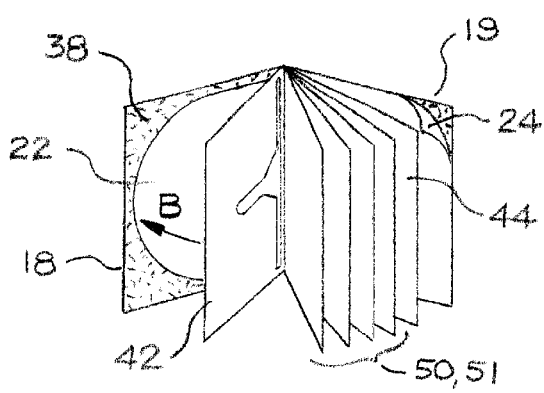

As seen in FIG. 2(b), a booklet 30 is formed from the stacked leaves. The booklet 30 is bound along a fold line 32 by a stitched seam 34. As indicated by arrow "A" in FIG. 2(b), the booklet 30 is assembled to a cover 16. The cover 16 includes a fold 17 which divides the cover into a first panel 18 and a second panel 19. The inside surfaces of the cover 16 are flood coated with an adhesive layer 36. As best seen in FIG. 2(c), the back fly page 24 is glued to the inside surface of the second panel 19 by the adhesive layer 36. Also, the front fly page 22 is glued to the inside surface of the firstpanel 18 by the adhesive layer 36. Because the front fly page 22 is smaller than the first panel 18, a C-shaped strip of adhesive 38 is left uncovered by the front fly page 22.

Figure 2D:
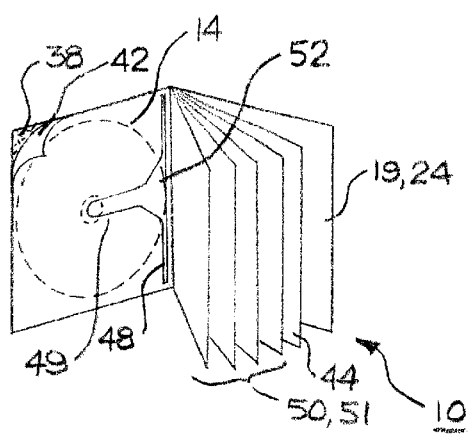

The slotted front page 42 is attached to the first panel 18 as indicated by arrow "B" in FIG. 2(c). As shown in FIG. 2(d), the slotted front page 42 is glued to the first panel 18 by the C-shaped strip of adhesive 38, thereby forming a pocket 52. The semicircular shape of the adhesive strip shown in FIG. 2(c) causes the pocket 52 to have a semicircular bottom for closely supporting a compact disc 14 inserted into the pocket 52 through the slit 48. Alternatively, the C-shaped adhesive strip 38 may have a square-like shape like that shown in FIG. 3(c) to form a square bottom in the pocket 52. The cutout 49 along the slit 48 permits a person to more easily grasp a compact disc 14 in the pocket 52. The cutout 49 may be shaped as shown in FIG. 2d, an arcuate shape like cutout 49 in FIG. 3(c), or any other suitable shape. The additional pages 51 contain printed information about the content of the compact disc 14. The stitched seam 34 of the booklet 30 is hidden along the spine of the holder/booklet by the cover 16, thereby providing a finished, high-quality outer appearance. Therefore, no staples are used in the construction of the holder/booklet 10 and no staples are exposed along the spine of the holder/booklet.

The glue which is flooded onto the inner surfaces of the first and second panels 18, 19 comprises a resin emulsion adhesive (Evans No. 04053, Evans Adhesive Corp., Columbus, Ohio). The composition of Evans No. 04053 is a vinyl acetate ethylene copolymer emulsion. The adhesive may include other additives, for example, a defoamer. The copolymer emulsion is water-based and contains approximately 45% water, and the vinyl acetate ethylene copolymer emulsion content is approximately >95.0 wt. %. It is contemplated that any comparable adhesive may be used as to form the glue strip 38.

Figure 3A:
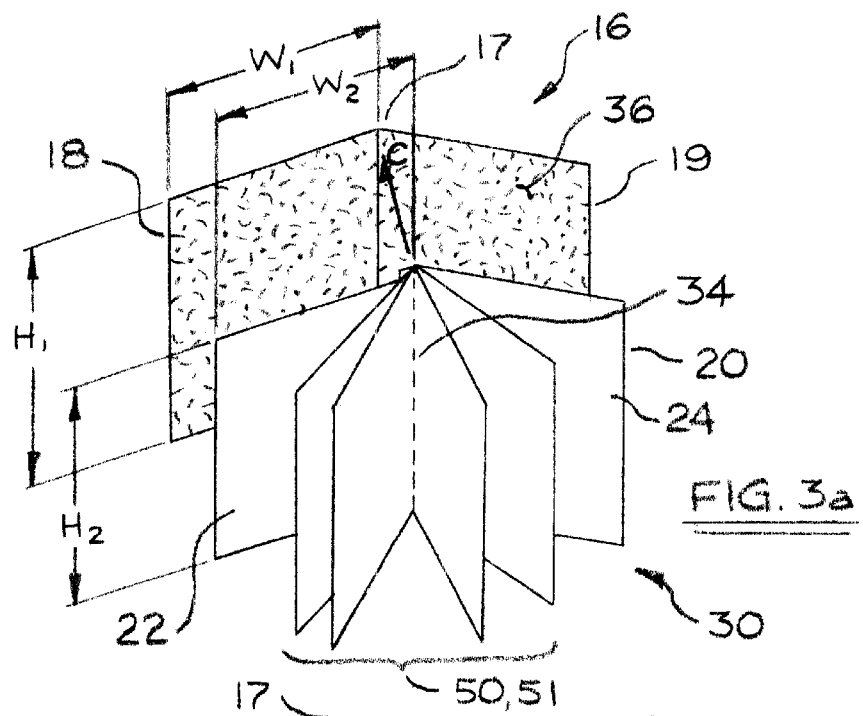
FIGS. 3(a)–3(c) are perspective views illustrating another construction for the combination compact disc holder and informational booklet of FIGS. 1(a) and 1(b)
Figure 3B:
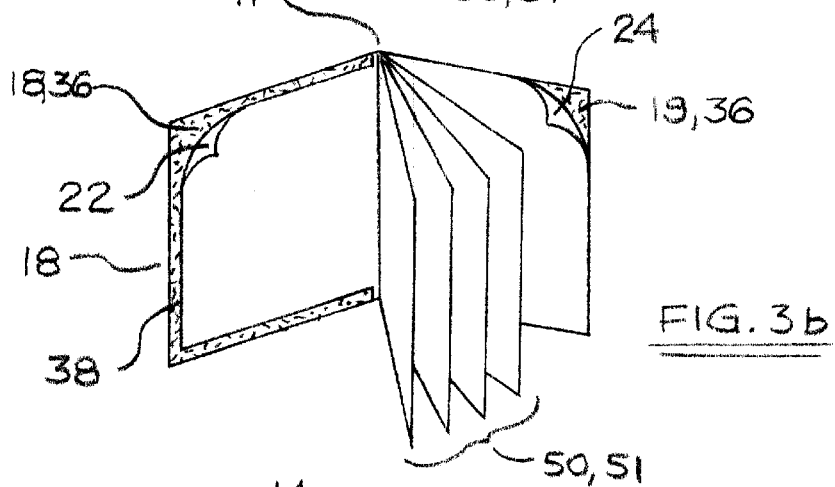
Figure 3C:
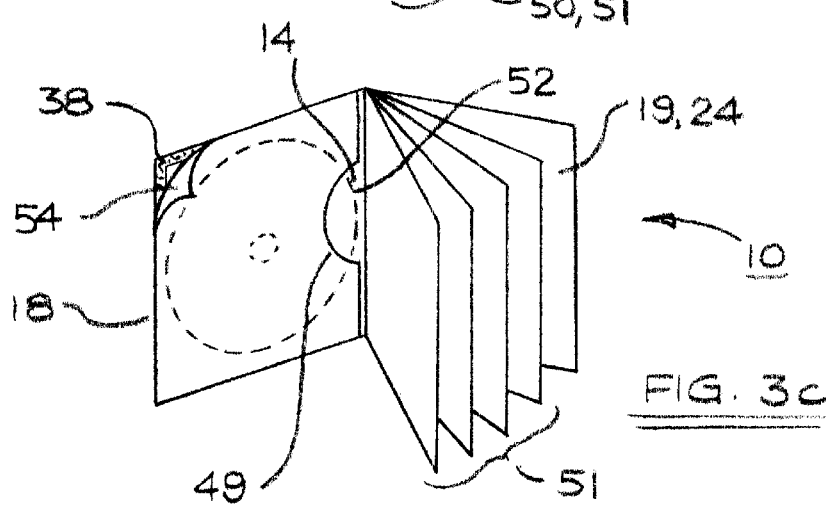

FIGS. 3(a)–3(c) illustrate a second construction of the combination compact disc holder and informational booklet 10 in accordance with the present invention. The holder 10 includes a cover 16. The cover 16 is folded in half at the fold 17 which divides the cover 16 into a first panel 18 and a second panel 19. A booklet 30 has a stitched seam 34 connecting a fly sheet 20 to additional leaves 50. The fly sheet 20 includes a front fly page 22 and a back fly page 24. The front fly page 22 has a width $W_2$ and height $H_2$. The width $W_2$ and height $H_2$ are respectively narrower and shorter than the width $W_1$ and height $H_1$ of the first panel 18. The inside surfaces of the cover 16 are flood coated with an adhesive layer 36, and the booklet 30 is assembled to the cover 16 as indicated by arrow "C" in FIG. 3(a).

The front fly page 22 is glued to the first panel 18 as seen in FIG. 3(b). The back fly panel 24 is similarly glued to the second panel 19. The narrower and shorter front fly page 22 leaves a portion of the adhesive 36 on the first panel uncovered, thereby forming a C-shaped strip of adhesive 38. Preferably, the adhesive strip has a width between about one-eighth inch and about one-quarter inch. As seen in FIG. 3(c), a separate pocket sheet 54 is attached to the inside of the first cover panel 18 by the C-shaped adhesive strip 38, thereby forming a pocket 52. The pocket 52 preferably is square and is sized to receive and retain a compact disc 14 as shown. The edge of the separate pocket sheet 54 adjacent to the fold of the booklet includes a cutout 49 to facilitate grasping a compact disc 14 in the pocket 52. The cutout 49 may have an arcuate shape as shown, or any other suitable shape that facilitates grasping a disc 14 in the pocket 52. The additional pages 51 are used to print information about the content of the compact disc 14.

FIGS. 4(a)–4(b) illustrate another construction for the holder/booklet 10 shown in FIGS. 1(a) and 1(b). In this construction, the cover 60 includes a front panel 62, a middle panel 64, and a rear panel 66. A booklet 30 like that described above is attached to the middle panel 64 and rear panel 66 as indicated by arrow "D." The booklet 30 is attached by a flood coated adhesive layer 36 on the inside surfaces of the middle and rear panels 64, 66. As seen in FIG. 4(b), the front fly page 22 is glued to the middle panel 64 and a back fly page 24 is glued to the rear panel 66. The front fly page 22 is sized to leave a top adhesive strip 70 and bottom adhesive strip 72 exposed along top and bottom edges of the middle panel 64. The front panel 62 is folded against the middle panel 64 as indicated by arrow "E" in FIG. 4(b). As best seen in FIG. 4(c), the front panel 62 is glued to the middle panel 64 by the adhesive strips 70, 72, thereby forming the pocket 52 for a compact disc 14. The side edge of the front panel 62 includes a cutout 63 to facilitate grasping a disc 14 in the pocket 52.

In each of the various constructions of holder/booklet 10 described above, the adhesive strips used to form the pocket 52 are formed by flood coating inside surfaces of the cover panels with an adhesive layer and overlaying a fly sheet that leaves adhesive strips uncovered. Alternatively, the fly sheets 20 and fly pages 22, 24 may be omitted altogether, and the adhesive strips may be applied directly to the cover panels only in the desired areas of the cover panels. The strips of adhesive may be applied to the cover panels by rolling, screening, or any other suitable means.

Also, each of the embodiments described above includes a single pocket 52 on the inside of one of the two cover panels. Alternatively, a second pocket (not shown) may also be formed on the second cover panel in the same manner as the first pocket.

Figure 5A:
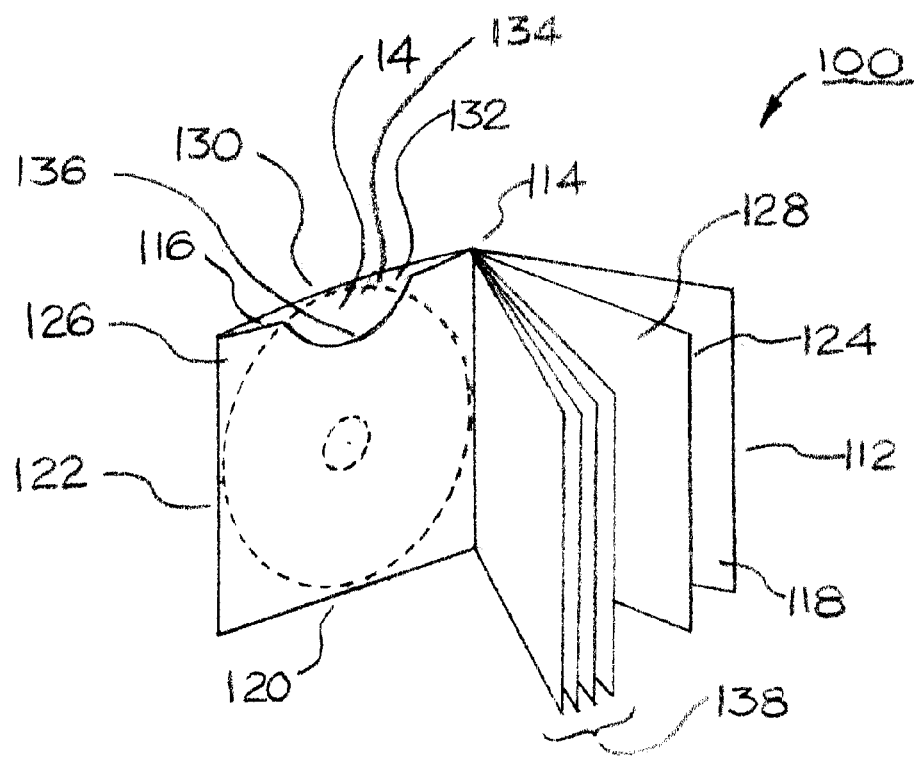
FIGS. 5(a) and 5(b) are perspective views illustrating another embodiment of a combination compact disc holder and informational booklet according to the present invention.
Figure 5B:
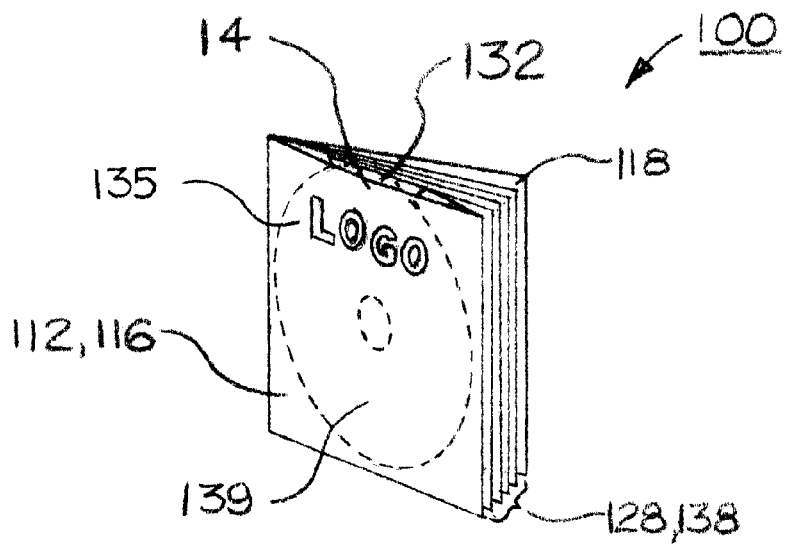
Figure 6A:
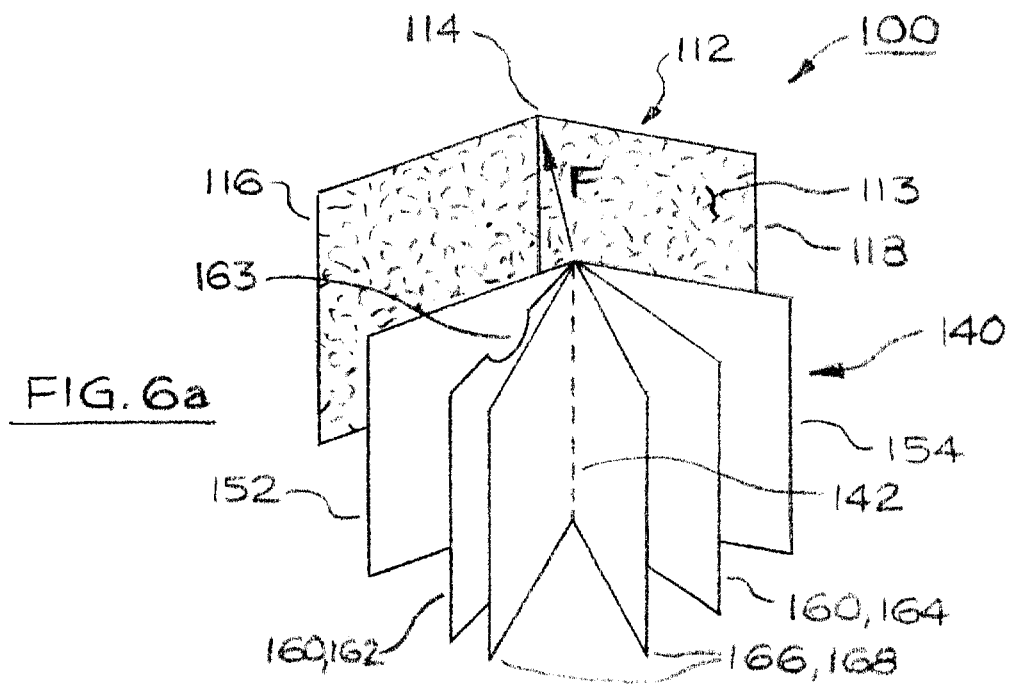
FIGS. 6(a)–6(c) are perspective views showing a construction for the combination compact disc holder and informational booklet of FIGS. 5(a)–5(c)
Figure 6B:
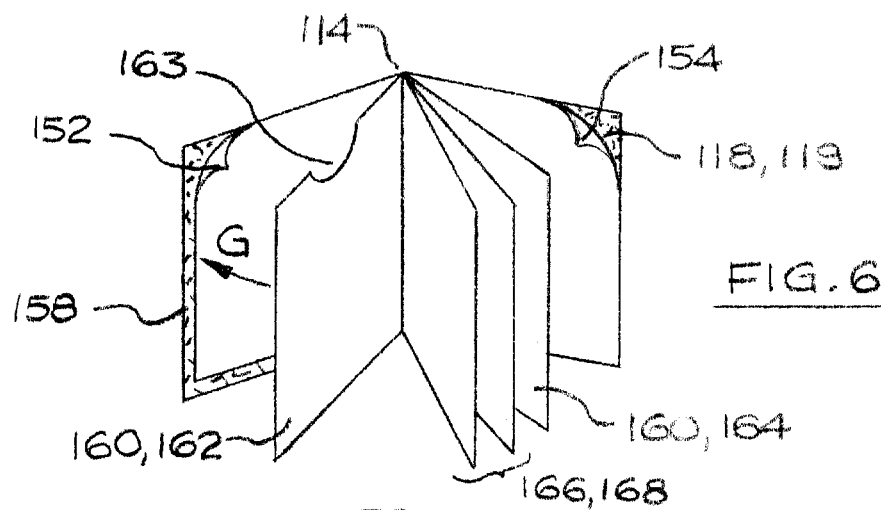

FIGS. 5(a) and 5(b) generally illustrate another embodiment 100 of a compact disc holder and booklet according to the present invention. In this embodiment, the pocket 132 has a pocket opening 134 along an upper edge 130 of the front cover panel 116. FIGS. 6(a)–6(b) illustrate one construction for the holder booklet 100. As seen in FIG. 6(a), a booklet 140 includes a fly leaf 150 having a front fly page 152 and a back fly page 154. A second leaf 160 includes a pocket page 162 and a last page 164. The upper edge of the pocket page 162 includes a cutout 163. The booklet 140 also includes one or more additional leaves 166 including additional pages 168. The leaves forming the booklet 140 are connected by a stitched seam 142 along a central fold.

The holder booklet 100 also includes a cover 112. A central fold 114 divides the cover into a front cover panel 116 and a back cover panel 118. The inside surfaces of the cover 112 are flood coated with an adhesive layer 113. The booklet 140 is assembled to the cover 112 as indicated by arrow "F" in FIG. 6(a).

Referring to FIG. 6(b), the front fly page 152 is glued to the inside surface of the front cover panel 116 by the adhesive layer 113. Because the front fly page is smaller than the front cover panel 116, a portion of the adhesive 113 is not covered by the front fly page 152, thereby forming an L-shaped strip of adhesive 158 as shown in FIG. 6(b). The back fly page 154 is glued to the back cover panel 118. The pocket page 162 is laid against the front cover panel 116 and front fly page 152 as indicated by arrow "G" in FIG. 6(b).

Figure 6C:
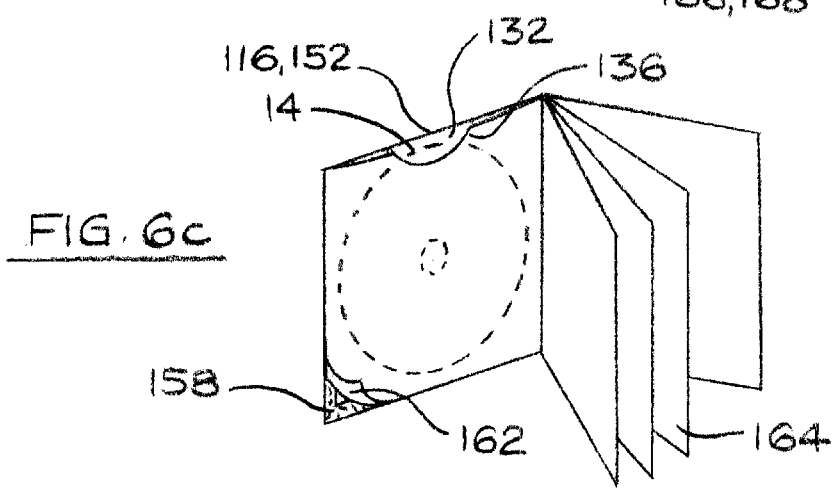

As seen in FIG. 6(c), the pocket page 162 is glued to the front cover panel 116 by the L-shaped adhesive strip 158, thereby forming a pocket 132. The cutout 136 facilitates grasping a disc 14 in the pocket 132. The last page 164, and the additional pages 138 can be used to print information about a disc 14 in the pocket. Of course, the pocket 132 could be likewise constructed on the back cover panel 118 instead of on the front cover panel 116. Similarly, a first pocket may be located on the front cover panel 116 and a likewise constructed second pocket located on the back cover panel 118 (not shown).

Figure 7A:
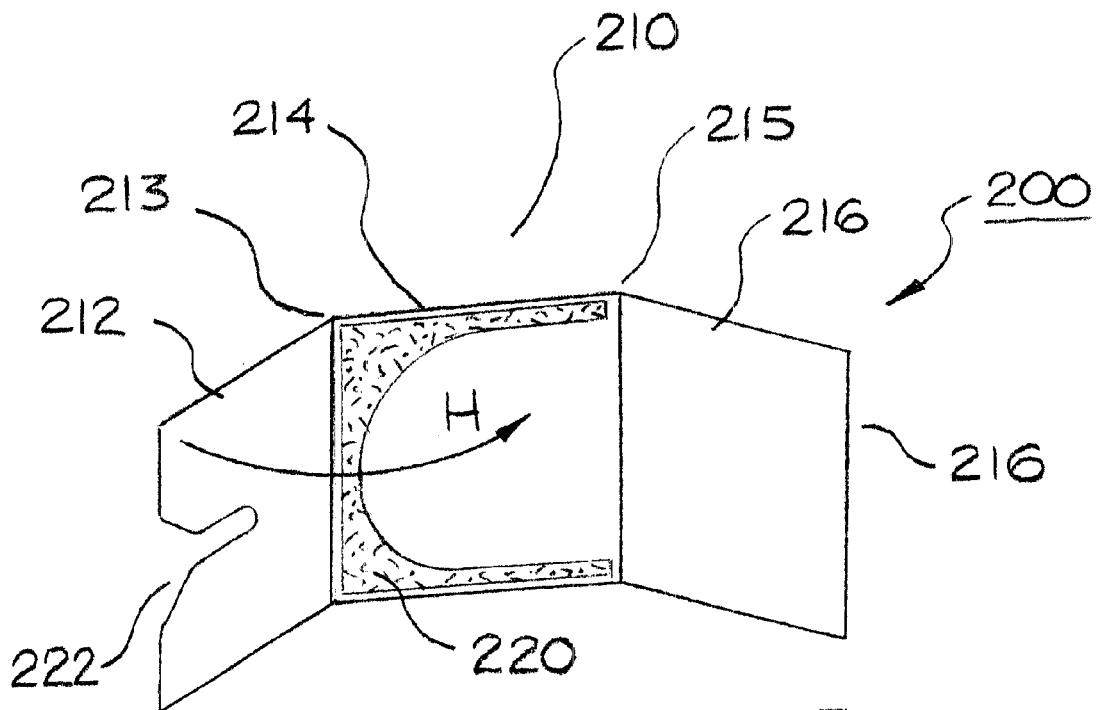
FIGS. 7(a) and 7(b) are perspective views illustrating a construction for a leaf having a pocket for inclusion in a combination compact disc holder and informational booklet according to the present invention.
Figure 7B:
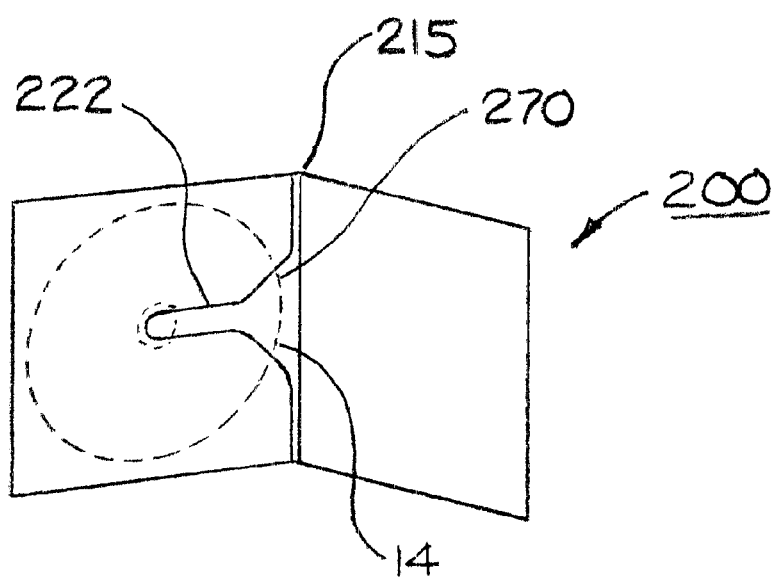

Because it may be desirable to include more than one or two pockets for compact discs in a CD holder/booklet, the invention also includes a pocketed leaf 200 as shown in FIGS. 7(a) and 7(b). One or more of these pocketed leafs 200 may be included in the booklets 30 or 140 of the holder/booklets described above. As seen in FIG. 7(a), each pocketed leaf 200 includes a sheet 210 that has a first panel 212, a first fold 213, a second panel 214, a second fold, 215, and a third panel 216. An outer edge of the first panel includes a cutout 222. A C-shaped adhesive strip 220 is screened or otherwise applied on the inside surface of the second panel 214 as shown. The first panel 212 is folded against the second panel as indicated by arrow "H" in FIG. 7(a) and is adhered thereto by the adhesive strip 220. As seen in FIG. 7(b), a pocket 270 is formed for receiving a compact disc 14. The cutout 222 facilitates grasping a disc 14 in the pocket 270. The pocketed leaf 200 may be included in a booklet 30 or 140 in the holder/booklets 10, 100 described above and stitched with the other leaves in the booklet along the fold 215.

Figure 8A:
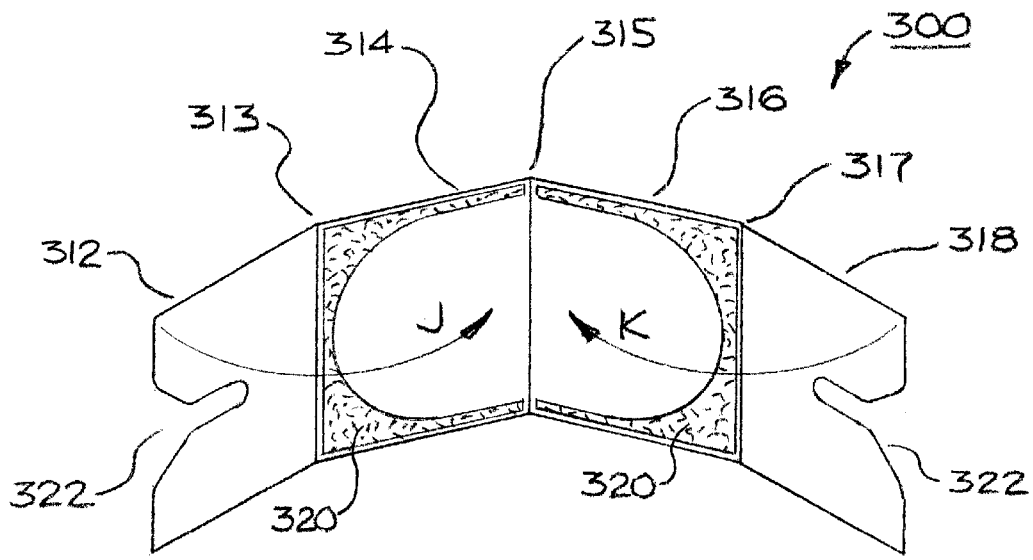
FIGS. 8(a) and 8(b) are perspective views illustrating a construction for a leaf having a front pocket and a rear pocket.
Figure 8B:
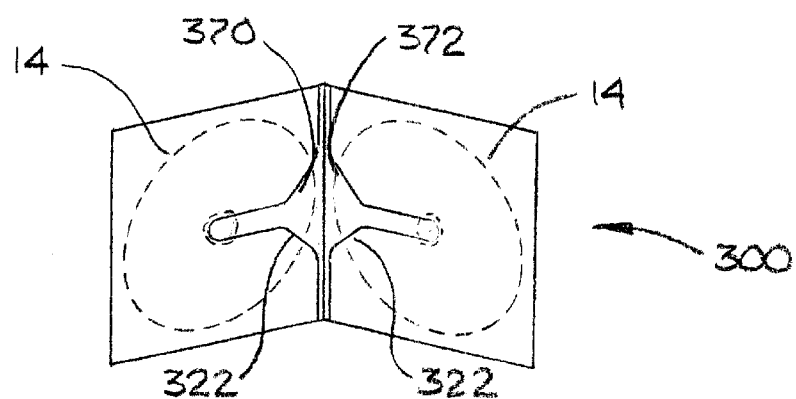

FIGS. 8(a) and 8(b) illustrate another embodiment 300 of a pocketed leaf for inclusion in a booklet 30 or 140. In this embodiment, two pockets 370, 372 are provided. As seen in FIG. 8(a), the pocketed leaf 300 includes a sheet 310 that has a first panel 312, a first fold 313, a second panel 314, a second fold, 315, a third panel 316, a third fold 317, and a last panel 318. Outer edges of the first and last panels 312, 318 include cutouts 322 as shown. A C-shaped adhesive strip 320 is applied to the inside surfaces of both the second panel 314 and third panel 316 as shown. The first panel 312 is folded against the second panel as indicated by arrow "J" in FIG. 8(a) and is adhered thereto by the adhesive strip 320. Similarly, the last panel 318 is folded against the third panel 316 as indicated by arrow "K" and is adhered thereto by adhesive strip 320. As seen in FIG. 8(b), two pockets 370, 372 are formed for receiving compact discs 14. The cutouts 322 facilitate grasping discs 14 in the pockets 370, 372. The pocketed leaf 300 may be included in a booklet 30 or 140 in the holder/booklets 10, 100 described above and stitched with the other leaves in the booklet along the fold 315.

The adhesives used to assemble the various embodiments of the invention disclosed herein are set by pressing the assembled holders/booklets in a flat state. Preferably, the stacked and adhered leaves and cover are squeezed together in an air-powered vise which sets the adhesive between adjacent panels/pages. Each time, the vise is squeezed under approximately 2800 lbs/in. of pressure for a sufficient amount of time in which to properly seal the adhesive. The pressure may range between about 2000 and 4000 lbs/in. In a preferred embodiment, the vise may be squeezed between about 30 seconds and about one minute, respectively While this invention has been illustrated and described in accordance with a preferred embodiment, it is recognized that variations and changes may be made therein without departing from the invention as set forth in the claims.

Certain modifications and improvements will occur to those skilled in the art upon a reading of the forgoing description. By way of example, it is contemplated that the combination compact disc holder and booklet of the present invention can be modified or adapted for use with other storage media such as digital video discs or other similar optical discs or the like. It should be understood that all such modifications are not contained herein for the sake of conciseness and readability, but are properly within the scope of the following claims.

What is claimed is:

1. A combination compact disc holder and informational booklet comprising:

(a) a paper cover having a fold which divides the cover into a first cover panel and a second cover panel, the first and second cover panels each having an inside surface, an outside surface, a bottom edge, a side edge, and a top edge;

(b) a booklet of multiple paper leaves, the leaves being folded and sewn along a fold line to form a first page, a second page, a last page, a next to last page, and a plurality of additional pages, the pages being of substantially the same size and shape as the first and second panels of the cover;

wherein the second page includes a slit that is parallel to the fold line; and (c) an adhesive coating applied to the inside surfaces of the first and second cover panels, wherein the first and last page of the booklet are adhesively attached to the inside surface of the first and second cover panels by the adhesive coating;

the first page being slightly smaller than the first cover panel, thereby leaving a C-shaped adhesive strip therearound;

(d) wherein the second page is attached to the adhesive strip to form a pocket between the second page and the first page of the booklet, the slit in the second page forms a pocket opening, and the pocket and pocket opening are of suitable size to receive and retain a compact disc.

2. The combination compact disc holder and booklet according to claim 1 wherein the second page further includes a cutout along an edge of the slit, wherein the cutout is of suitable size and shape to facilitate grasping a compact disc in the pocket.

3. The combination compact disc holder and booklet according to claim 1 further including a protective plastic coating on the outside surfaces of the first and second cover panels.

4. The combination compact disc holder and booklet according to claim 1 wherein:
 (a) the next to last page of the booklet includes a second slit that is parallel to the fold line;
 (b) the last page of the booklet is slightly smaller than the last cover panel, and thereby leaves a second C-shaped adhesive strip therearound; and
 (c) the next to last page of the booklet is attached to the second adhesive strip to form a second pocket between the next to last page and the last page of the booklet, wherein the second slit in the next to last page forms a second pocket opening, and the second pocket and second pocket opening are of suitable size to receive and retain a compact disc.

5. The combination compact disc holder and booklet according to claim 1 wherein at least one of the multiple paper leaves in the booklet includes at least one page that includes an additional pocket, wherein the additional pocket is of suitable size to receive and retain a compact disc.

6. The combination compact disc holder and booklet according to claim 1 wherein the dimensions of the holder/booklet when folded at the fold of the cover are about 5¼ inches tall by about 5¼ inches wide.

7. A combination compact disc holder and informational booklet comprising:
 (a) a paper cover having a fold which divides the cover into a first cover panel and a second cover panel, the first and second cover panels each having an inside surface, an outside surface, a bottom edge, a side edge, and a top edge;
 (b) a booklet of multiple paper leaves, the leaves being folded and sewn along a fold line to form a first page, a last page, and a plurality of additional pages, the pages with the exception of the first page being of substantially the same size and shape as the first and second panels of the cover;
 (c) an adhesive coating applied to the inside surfaces of the first and second cover panels, wherein the first and last page of the booklet are adhesively attached to the inside surfaces of the first and second cover panels by the adhesive coating;
  the first page being slightly smaller than the first cover panel, thereby leaving a C-shaped adhesive strip therearound; and
 (d) a pocket sheet attached to the adhesive strip to form a pocket between the pocket sheet and the first page of the booklet, wherein the pocket is of suitable size to receive and retain a compact disc and has an opening adjacent to the fold line.

8. The combination compact disc holder and booklet according to claim 7 wherein the pocket sheet further includes a cutout along an unattached edge adjacent to the fold line of the booklet, wherein the cutout is of suitable size and shape to facilitate grasping a compact disc in the pocket.

9. The combination compact disc holder and booklet according to claim 7 further including a protective plastic coating on the outside surfaces of the first and second cover panels.

10. The combination compact disc holder and booklet according to claim 7 wherein:
 (a) the last page of the booklet is slightly smaller than the last cover panel, and thereby leaves a second C-shaped adhesive strip therearound; and
 (b) a second pocket sheet is attached to the second adhesive strip to form a second pocket between the second pocket sheet and the last page of the booklet, wherein the second pocket is of suitable size to receive and retain a compact disc and has an opening that is adjacent to the fold line.

11. The combination compact disc holder and booklet according to claim 7 wherein at least one of the multiple paper leaves in the booklet includes at least one page including an additional pocket, wherein the additional pocket is of suitable size to receive and retain a compact disc.

12. The combination compact disc holder and booklet according to claim 7 wherein the dimensions of the holder/booklet when folded at the fold of the cover are about 5¼ inches tall by about 5¼ inches wide.

13. A combination compact disc holder and informational booklet comprising:
 (a) a paper cover having a first fold which divides the cover into a first cover panel and a second cover panel, and a second fold parallel to the first fold which divides the cover between the second cover panel and a third cover panel, the first, second, and third cover panels each having an inside surface, an outside surface, a bottom edge, and a top edge, and the first cover panel having a side edge;
 (b) a booklet of multiple paper leaves, the leaves being folded and sewn along a fold line to form a first page, a last page, and a plurality of additional pages, the pages being of substantially the same size and shape as the cover panels of the cover;
 (c) an adhesive coating applied to the inside surfaces of the second and third cover panels, wherein the first and last page of the booklet are adhesively attached to the inside surfaces of the first and second cover panels respectively by the adhesive coating;
  the first page being slightly shorter in height than the second cover panel, thereby leaving first adhesive strip along the top edge of the second cover panel and a second adhesive strip along the bottom edge of the second cover panel;
 (d) wherein the first cover panel is folded against the inside surface of the second cover panel along the first fold and is attached to the second cover panel by the first and second adhesive strips, thereby forming a pocket between the first cover panel and the first page of the booklet, wherein the pocket is of suitable size to receive and retain a compact disc and has an opening adjacent to the fold line.

14. The combination compact disc holder and booklet according to claim 13 wherein the first cover panel further includes a cutout along its side edge adjacent to the pocket opening, wherein the cutout is of suitable size and shape to facilitate grasping a compact disc in the pocket.

15. The combination compact disc holder and booklet according to claim 13 further including a protective plastic coating on the outside surfaces of the second and third cover panels.

16. The combination compact disc holder and booklet according to claim 13 wherein:
 (a) the cover further includes a fourth cover panel, wherein a third fold that is parallel to the second fold divides the cover between the third cover panel and the fourth cover panel;

(b) the last page of the booklet is slightly shorter in height than the third cover panel, thereby leaving a third adhesive strip along the top edge of the third cover panel and a third adhesive strip along the bottom edge of the third cover panel;

(c) wherein the fourth cover panel is folded against the inside surface of the third cover panel along the third fold and is attached to the third cover panel by the third and fourth adhesive strips, thereby forming a second pocket between the fourth cover panel and the last page of the booklet, wherein the second pocket is of suitable size to receive and retain a compact disc and has an opening adjacent to the fold line.

17. The combination compact disc holder and booklet according to claim 13 wherein at least one of the multiple paper leaves in the booklet includes at least one page including an additional pocket, wherein the additional pocket is of suitable size to receive and retain a compact disc and has an opening adjacent to the fold line.

18. The combination compact disc holder and booklet according to claim 13 wherein the dimensions of the holder/booklet when folded at the second fold of the cover are about 5¼ inches tall by about 5¼ inches wide.

* * * * *